(12) United States Patent
Roth

(10) Patent No.: US 11,105,444 B2
(45) Date of Patent: Aug. 31, 2021

(54) FRANGIBLE HANGER ASSEMBLY AND METHOD

(71) Applicant: Steven A. Roth, Alamo, CA (US)

(72) Inventor: Steven A. Roth, Alamo, CA (US)

( * ) Notice: Subject to any disclaimer, the term of this patent is extended or adjusted under 35 U.S.C. 154(b) by 0 days.

(21) Appl. No.: 15/052,067

(22) Filed: Feb. 24, 2016

(65) Prior Publication Data
US 2016/0252197 A1 Sep. 1, 2016

Related U.S. Application Data

(60) Provisional application No. 62/176,853, filed on Feb. 26, 2015.

(51) Int. Cl.
*F16L 3/133* (2006.01)
*F16B 1/00* (2006.01)
*F16B 31/02* (2006.01)

(52) U.S. Cl.
CPC ............... *F16L 3/133* (2013.01); *F16B 1/00* (2013.01); *F16B 31/021* (2013.01)

(58) Field of Classification Search
CPC ......... F16L 3/133; F16L 3/11; F16L 313/045; F16B 1/00; Y10S 248/90; Y10S 403/03; Y10S 248/909; Y10T 403/11; E01F 9/635
USPC ......... 248/548, 58, 59, 62, 63, 64, 317, 323, 248/327, 328, 900; 52/98; 403/2; 439/154; 116/112, 212; 73/862.53
See application file for complete search history.

(56) References Cited

U.S. PATENT DOCUMENTS

| | | | | |
|---|---|---|---|---|
| 2,085,074 A * | 6/1937 | Boyles | ...................... | E03B 9/02 137/272 |
| 2,966,878 A * | 1/1961 | Feiser, Jr. | ............... | F16G 13/14 116/212 |
| 3,024,647 A * | 3/1962 | Merriman | ............ | G01L 5/0033 73/862.01 |
| 3,077,178 A * | 2/1963 | Gordon | .................. | F16G 13/14 116/212 |
| 3,506,227 A * | 4/1970 | Jenkins | ...................... | F16L 3/11 248/59 |
| 3,582,032 A * | 6/1971 | Placek | .................... | F42B 25/00 248/317 |
| 3,846,030 A * | 11/1974 | Katt | ....................... | F16B 7/0426 285/4 |
| 3,853,546 A * | 12/1974 | Werner | .................... | G01G 3/00 73/862.53 |
| 4,078,752 A * | 3/1978 | Kindorf | .................... | F16L 3/00 248/354.4 |

(Continued)

OTHER PUBLICATIONS

"An Investigation of the Bearing Strength of Bolted Connections In Aluminum and Titanium Alloys"; by Nicholas E. Tinl; Dec. 10, 2011 (Year: 2011).*

(Continued)

*Primary Examiner* — Ingrid M Weinhold
(74) *Attorney, Agent, or Firm* — Steven R. Vosen

(57) ABSTRACT

A hanger assembly and method of hanging conduits in buildings is described which protects the structure of the building from damage during a seismic event. The hanger assembly includes a frangible element which is calibrated to break when subjected to some higher than normal tensile load resulting from rapid acceleration of the conduit. Thus, for example, in the event of an earthquake, the hanger will fail before damage is done to the concrete to which the anchor is attached.

12 Claims, 12 Drawing Sheets

(56) References Cited

U.S. PATENT DOCUMENTS

| | | | | |
|---|---|---|---|---|
| D250,088 S | * | 10/1978 | McDonald, Jr. | D8/355 |
| 4,706,387 A | * | 11/1987 | Wichorek | G01B 5/30 33/786 |
| 4,934,650 A | * | 6/1990 | LeKuch | F16L 55/035 248/60 |
| 4,992,778 A | * | 2/1991 | McKeen | B66C 15/00 116/212 |
| 5,118,066 A | * | 6/1992 | Perrault | H02G 3/263 248/333 |
| 5,269,565 A | * | 12/1993 | Langner | E21B 43/0107 248/548 |
| 5,295,647 A | * | 3/1994 | Weidler | F16L 3/133 248/62 |
| 5,315,064 A | * | 5/1994 | Andrews | H01R 13/633 174/40 R |
| 5,320,439 A | * | 6/1994 | Perrault | F16L 3/22 248/58 |
| 5,379,647 A | * | 1/1995 | Sherwin | G01N 3/064 33/787 |
| 5,400,868 A | * | 3/1995 | Ellis | A63C 11/00 182/18 |
| 5,452,679 A | * | 9/1995 | Eckley | B66C 1/34 116/200 |
| 5,466,082 A | * | 11/1995 | Sherar | B66C 15/00 403/157 |
| 5,474,408 A | * | 12/1995 | Dinitz | F16B 31/021 256/13.1 |
| 5,484,217 A | * | 1/1996 | Carroll | E01F 9/642 248/548 |
| 5,655,476 A | * | 8/1997 | Wolter | B66C 1/125 116/212 |
| 5,782,040 A | * | 7/1998 | McCartan | E01F 9/635 345/690 |
| 6,007,267 A | * | 12/1999 | VanHorn | B66C 15/00 403/2 |
| 6,113,055 A | * | 9/2000 | Salman | E01F 9/635 248/548 |
| 6,210,066 B1 | * | 4/2001 | Dent | E01F 9/635 248/548 |
| 6,245,991 B1 | * | 6/2001 | Ryan | E04H 12/20 174/40 R |
| 6,382,583 B1 | * | 5/2002 | Hill, III | E04H 12/20 174/40 TD |
| 6,409,156 B2 | * | 6/2002 | Dent | E01F 9/635 248/548 |
| 6,488,434 B1 | * | 12/2002 | Graeff | B66C 15/00 403/2 |
| 7,290,748 B2 | * | 11/2007 | McDonald | H02G 7/02 248/548 |
| 7,316,169 B2 | * | 1/2008 | McCauley | G01G 23/005 116/212 |
| 7,607,401 B2 | * | 10/2009 | McCauley | G01G 23/005 116/212 |
| 7,780,122 B1 | * | 8/2010 | Herbers | E21F 17/02 248/333 |
| 7,871,045 B2 | * | 1/2011 | Moore | F16M 13/027 248/188.1 |
| 7,938,468 B2 | * | 5/2011 | Mueller | B66C 1/18 294/74 |
| 8,256,810 B2 | * | 9/2012 | Mueller | B66C 1/12 294/74 |
| 9,099,848 B2 | * | 8/2015 | MacAllister | H02G 7/04 |
| 9,163,422 B2 | * | 10/2015 | Heath | E04H 9/02 |
| 9,631,743 B2 | * | 4/2017 | Richter | F16L 51/04 |
| 2004/0031887 A1 | * | 2/2004 | Heath | F16L 3/133 248/62 |
| 2005/0081458 A1 | * | 4/2005 | McDonald | H02G 7/02 52/98 |
| 2005/0189452 A1 | | 9/2005 | Heath | |
| 2006/0024127 A1 | * | 2/2006 | Heath | F16L 3/133 403/150 |
| 2006/0190182 A1 | * | 8/2006 | LaBrie | F16L 3/16 702/18 |
| 2008/0092801 A1 | * | 4/2008 | Cloutier | F16B 31/021 116/212 |
| 2008/0121170 A1 | * | 5/2008 | Larsen | G01L 5/101 116/212 |
| 2009/0146020 A1 | * | 6/2009 | Moore | F16M 13/027 248/68.1 |
| 2011/0139942 A1 | * | 6/2011 | Moore | F16M 13/027 248/58 |
| 2012/0160983 A1 | * | 6/2012 | Gousseinov | F16L 3/20 248/511 |
| 2015/0050822 A1 | * | 2/2015 | MacAllister | H02G 7/04 439/154 |
| 2016/0040823 A1 | * | 2/2016 | Heath | E04H 9/02 248/354.3 |
| 2016/0091120 A1 | * | 3/2016 | Richter | F16L 51/04 248/60 |
| 2016/0208838 A1 | * | 7/2016 | Allmon | F16B 7/185 |
| 2017/0089493 A1 | * | 3/2017 | Richter | F16L 3/1218 |

OTHER PUBLICATIONS

"Edge Distance, Spacing, and Bearing In Bolted Connections"; By Lewis et al.; Jul. 1996 (Year: 1996).*

Eaton's B-Line Business, "Seismic restraints system guidelines", Seismic Brace Components—Tolco Rod Stiffener, Aug. 15, 2013, p. No. 5-7.

International Seismic Application Technology (I.S.A.T.), "Application & Design Manual", Stiffening Requirements—Threaded Rod, Second Edition, Apr. 18, 2001, p. G2.

Mason West, Inc., "Seismic Restraint Guidelines for Suspended Distribution Systems", Second Edition, Feb. 20, 2015, pp. 68, 78 and 79.

http://phd-mfg.comiproductsipipe-hangers-devices/band-hangers-or-copper-tubing-band-hanger/, Data Sheet.

www.erico.com, Loop Hangers, Swivel Loop Hanger 115, p. 21.

http://www.anvilintl.com/SharedContent/Pdf/Literature_Catalog/Pipe_Hangers.pdf, pp. 20, 21; 24, 36 & 38.

Steven A. Roth, co-pending U.S. Appl. No. 14/789,879, filed Jul. 1, 2015.

Steven Andrew Roth, co-pending U.S. Appl. No. 15/084,484, filed Mar. 30, 2016.

Steven A. Roth, co-pending U.S. Appl. No. 15/018,054, filed Feb. 8, 2016.

* cited by examiner

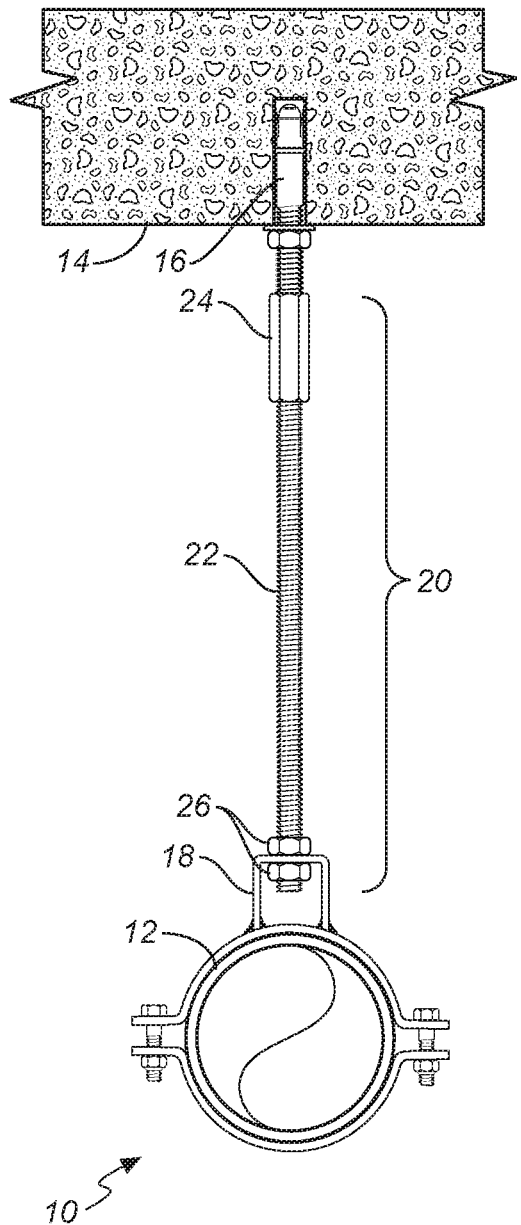
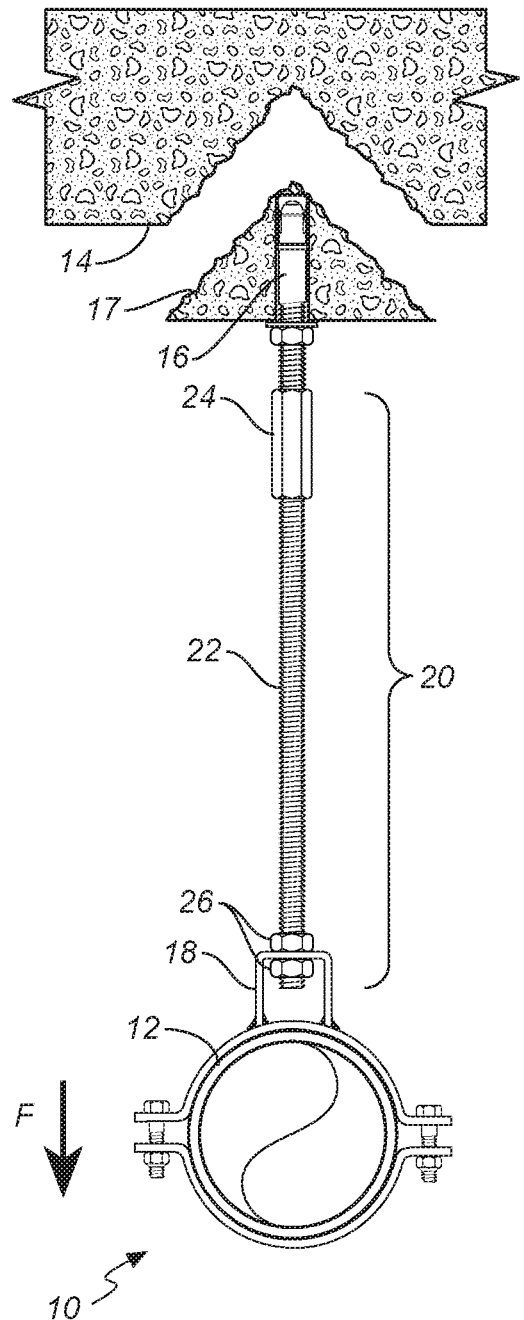
FIG. 1A
(PRIOR ART)
FIG. 1B
(PRIOR ART)

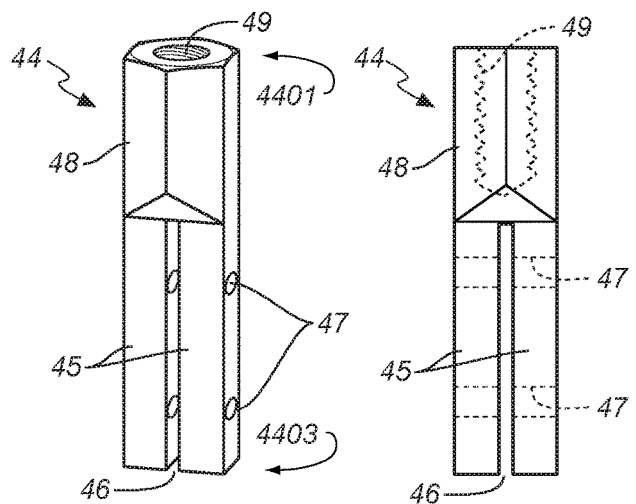
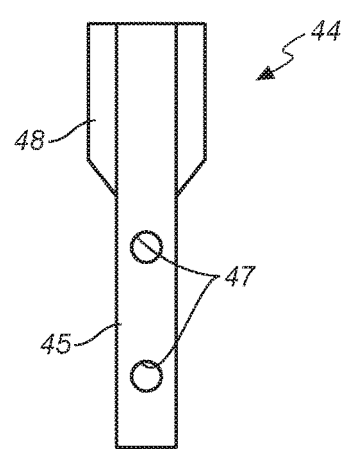
FIG. 3A  FIG. 3B  FIG. 3C
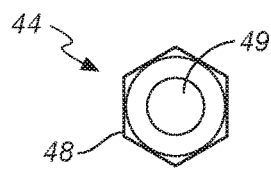
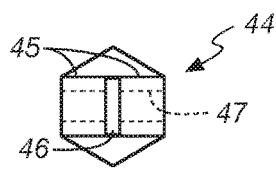
FIG. 3D  FIG. 3E
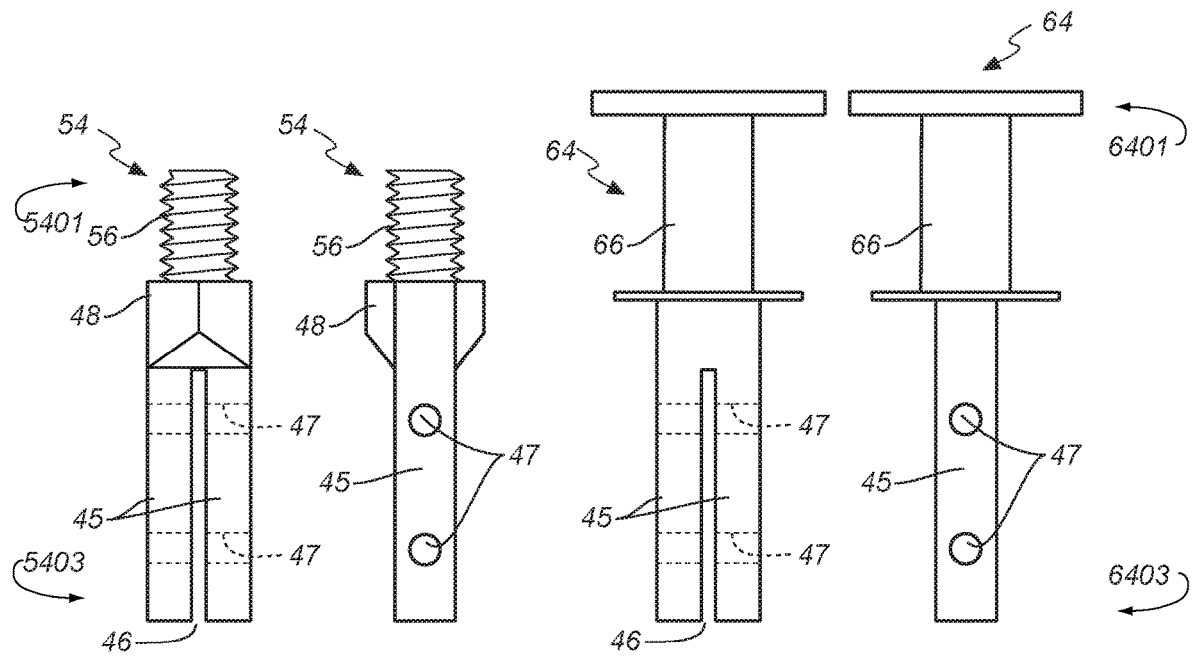
FIG. 4A  FIG. 4B  FIG. 5A  FIG. 5B

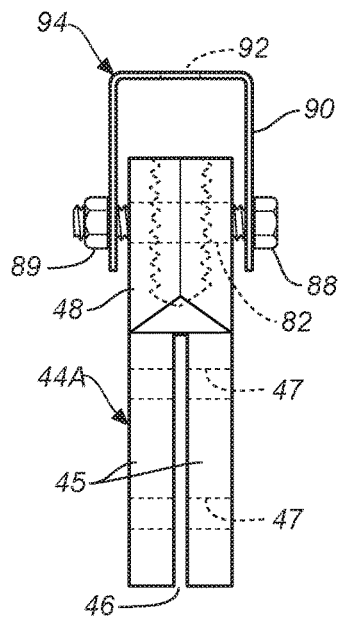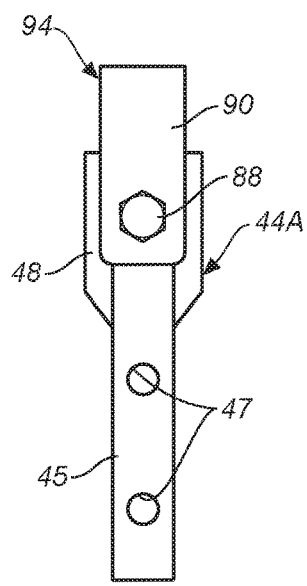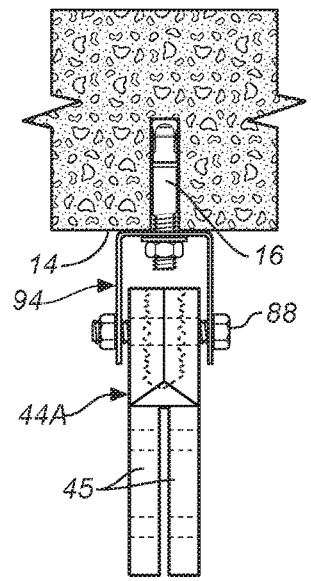
FIG. 12A   FIG. 12B   FIG. 12C
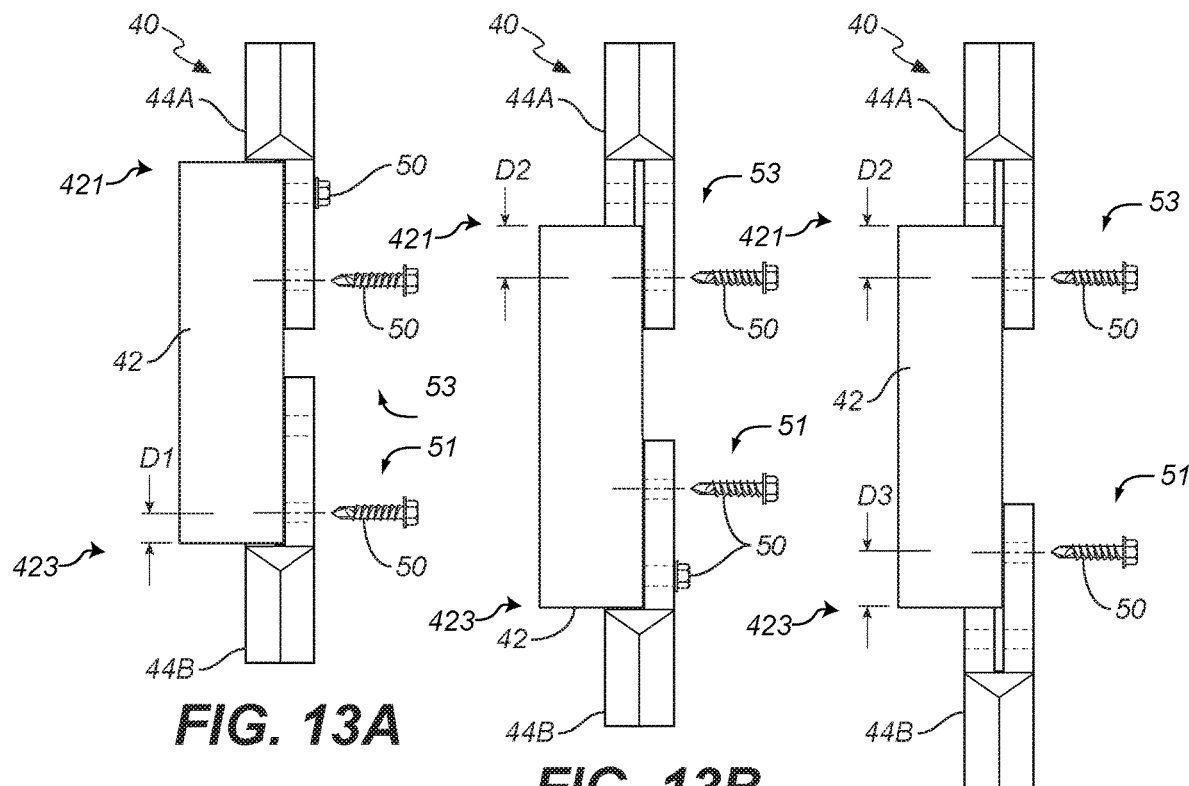
FIG. 13A   FIG. 13B   FIG. 13C

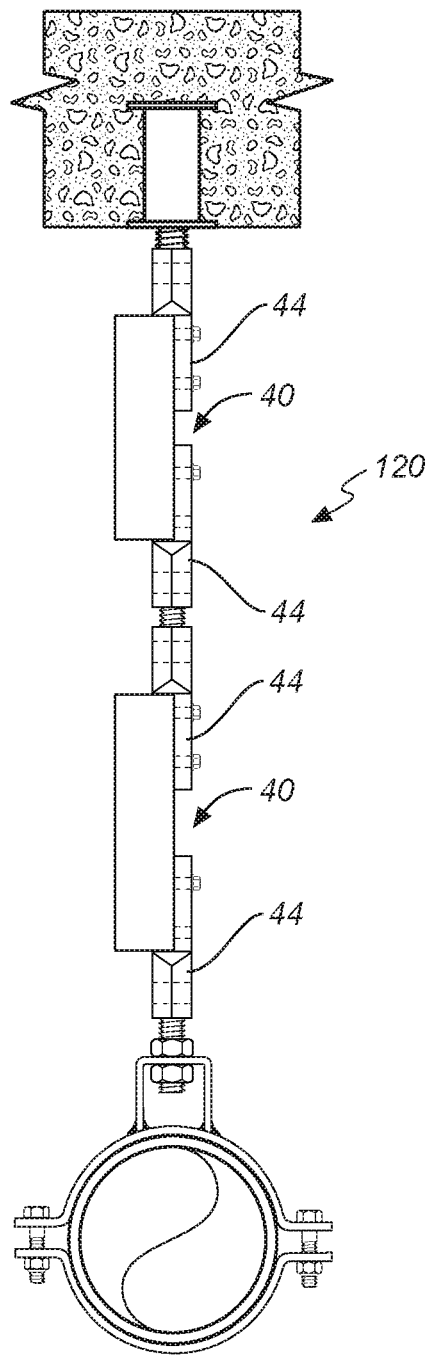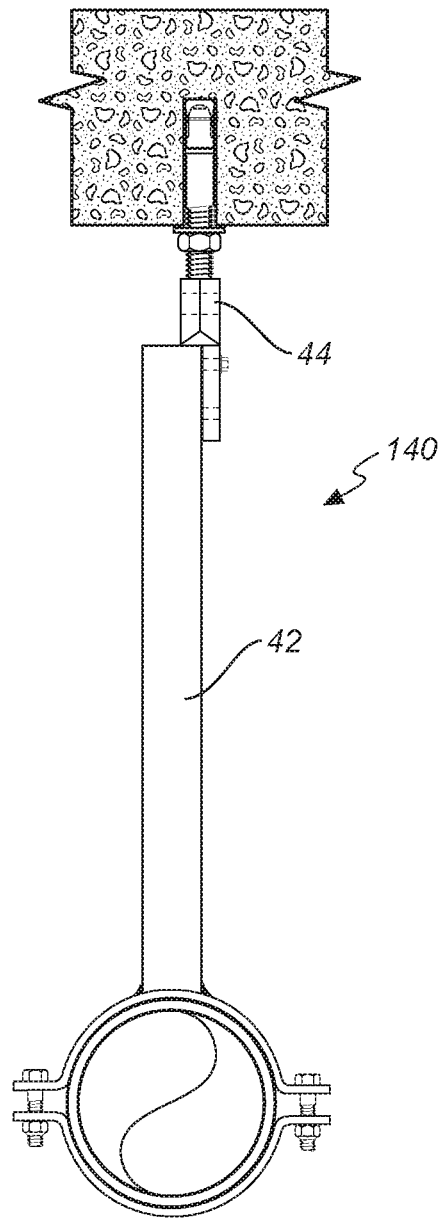
*FIG. 16*  *FIG. 17*

FRANGIBLE HANGER ASSEMBLY AND METHOD

CROSS-REFERENCE TO RELATED APPLICATIONS

This application claims the benefit of U.S. Provisional Application No. 62/176,753, filed Feb. 26, 2015, hereby incorporated by reference in its entirety.

BACKGROUND OF THE INVENTION

1. Field of the Invention

The present invention relates to an apparatus and method for building construction, and more particularly to an apparatus and method to protect building during seismic events.

2. Discussion of the Background

The pervasive style of providing services in commercial buildings is to vertically suspend the services from the underside of an overhead structure using hangers. Thus, for example, plumbing or electrical wiring can be provided into the interior of building by way of conduits that hang from structural elements of the building. Thus, for example, electrical conduits, plumbing pipes, sprinkler pipes, or mechanical piping systems are installed just below a ceiling. The services thus provide are referred to herein, without limitation, as "conduits" supported by "hangers."

When the overhead structure is a concrete slab or formed metal decking filled with concrete, a concrete-type anchorage is placed into the structure. Concrete-type anchorages include an element (referred to herein collectively as "anchor") that is typically a drill-in, shoot-in or glue-in type anchorage that is installed after the concrete has set, or a cast-in-place type anchorage that is positioned prior to the concrete being poured, so that it becomes cast into the finished concrete. The anchor typically presents a male threaded projection or female threaded aperture. In either instance the anchor would thus allow for a threaded connection to the structure.

The conduit is usually supported at multiple locations along its routing by a hanger, clamp or trapeze (referred to herein collectively as "bracket") that cradles or supports the conduit. Brackets come in many forms and vary depending on the type and/or size and/or quantity of the conduit.

The anchor and bracket are generally connected with a threaded rod, rod, cable, angle iron, strut channel or tubular material (referred to herein collectively as "connector"). The connector may include one or more elements disposed between the anchor and bracket to form a tension member that secures the conduit to the structure.

Movement of the earth or building in the event of an earthquake, explosion, impact or other types of events can greatly increase the load on the hanger. Thus for example, up and down ground motion during a seismic event can result in a rapidly varying anchor load, which is transferred to the supporting concrete. This load increase can cause the concrete to fail near the location of the anchor. Due to the large number of anchors in a building, the building structure may be threatened.

FIG. 1A is an elevational side view of a prior art conduit hanger assembly 10 installed to support a conduit 12 from the underside of a concrete deck 14. Conduit hanger assembly 10 includes an anchor 16 which may be placed in deck 14, a threaded rod 21 extending downwards from the anchor, a connector assembly 20 including a threaded rod 22, and threaded nuts 26 which support bracket 18 from threaded rod 22. Connector assembly 20 also includes a threaded link 24 which is used to attach threaded rod 21 and threaded rod 22.

FIG. 1B is the view of FIG. 1A where prior art conduit hanger assembly 10 is subjected to a sufficient force to cause the hanger assembly to fail. Typically, the weakest component in suspended hanger assembly 10 is the concrete, which will fail in tension. During a seismic event, for example, conduit 12 may move vertically, imparting a tension force on hanger assembly 10, as indicated by arrow F. In the example of FIG. 1B, the tension is sufficient for anchor 16 to cause the concrete in deck 14 to fail, resulting in failed causing the anchor 16 and a portion of the concrete 17 to break and/or pull away from the building. In most cases the strength of the concrete in this and adjacent area is irreparably damaged. After a seismic event it is possible to have many such anchor failures rendering portions of the building unsalvageable.

Thus there is a need in the art for a method and apparatus that permits conduits to be provided to buildings that can also protect the buildings from damage to seismic or impact loading. Such a method and apparatus should be easy to use, be compatible with current construction techniques, should provide for retro-fitting of existing installations and should be inexpensive.

BRIEF SUMMARY OF THE INVENTION

Embodiments presented herein overcome the disadvantages of prior art by providing a hanger assembly with a frangible element.

It is one aspect to provide a method of preventing damage to concrete deck that supports a load from a conduit, where the concrete deck is damaged if the supported load exceeds a maximum load. The method includes supporting the conduit from the concrete deck with a hanger assembly attached to the concrete deck, where the hanger assembly includes a frangible element that supports the weight of the conduit by the concrete deck, and where, if an event occurs which increases the force on the anchor from the conduit, the frangible element undergoes a ductile fracture before the supporting concrete is damaged.

It is another aspect to provide a hanger assembly attachable to an anchor affixed in a concrete deck, where the anchor damages the concrete deck if the hanger assembly supports more than a maximum load. The hanger assembly includes: a first hanger assembly end attachable to the anchor; a second hanger assembly end having a hanger for supporting a conduit; and a frangible element between the first hanger assembly end and the second hanger assembly end, where the frangible element undergoes a ductile fracture at a load that is less than the maximum load, such that the breakage of the frangible element prevents damage to the concrete deck.

It is yet another aspect to provide a hanger assembly attachable to an anchor affixed in a concrete deck and having a hanger to accept a conduit, where the anchor damages the concrete deck if the hanger assembly supports more than a maximum load. The hanger assembly includes: a frangible element having a first frangible element end and a second frangible element end; a first link including a first frangible element receiving portion to receive the first frangible element end; a user placeable first fastener to attach the first frangible element receiving portion and the received first frangible element end; a second link including a second frangible element receiving portion to receive the second frangible element end; and a user placeable second fastener to attach the second frangible element receiving portion and the received second frangible element end. The frangible element fails at a load that is less than the maximum load, such that the breakage of the frangible element prevents damage to the concrete deck.

These features together with the various ancillary provisions and features which will become apparent to those skilled in the art from the following detailed description, are attained by the vaporizer of the present invention, preferred embodiments thereof being shown with reference to the accompanying drawings, by way of example only, wherein:

BRIEF DESCRIPTION OF THE FIGURES

FIG. 1A is an elevational side view of a prior art conduit hanger assembly installed to support a conduit from the underside of a concrete deck;

FIG. 1B is the view of FIG. 1A, where the prior art conduit hanger assembly is subjected to a sufficient force to cause the hanger assembly to fail;

FIG. 3A is a perspective view of the one embodiment of a connector link;

FIG. 3B is a front elevational view of the connector link of FIG. 3A;

FIG. 3C is a side elevational view of the connector link of FIG. 3A;

FIG. 3D is a top plan view of the connector link of FIG. 3A;

FIG. 3E is a bottom plan view of the connector link of FIG. 3A;

FIG. 4A is a front elevational view of a second embodiment connector link;

FIG. 4B is a side elevational view of the connector link of FIG. 4A;

FIG. 5A is a front elevational view of a third embodiment connector link;

FIG. 5B is a side elevational view of the connector link of FIG. 5A;

FIG. 12A is a front elevational view of the second alternative connector link 44 of FIG. 11A with a clevis-type attachment;

FIG. 12B is a side elevational view of the connector link attachment of FIG. 12A;

FIG. 12C is a front elevational view of the connector link attachment of FIG. 12A attached to a concrete anchor;

FIG. 13A is a front elevational view of a first alternative embodiment connector link assembly;

FIG. 13B is a front elevational view of a second alternative embodiment connector link assembly;

FIG. 13C is a front elevational view of a third alternative embodiment connector link assembly;

FIG. 16 is an elevational view of an installed alternative conduit hanger assembly with two connector link assemblies in series;

FIG. 17 is an elevational view of an installed other alternative conduit hanger assembly with one connector link;

DETAILED DESCRIPTION OF THE INVENTION

The following description provides embodiments of apparatus that provide protection for building subject to events that increase the load on conduit hangers. Specifically, methods and apparatuses for supporting conduits using frangible hanger assemblies are described. Such methods and apparatus allow the conduit hanger to fail before the buildings to which they are attached.

Figures 2A, 2B:
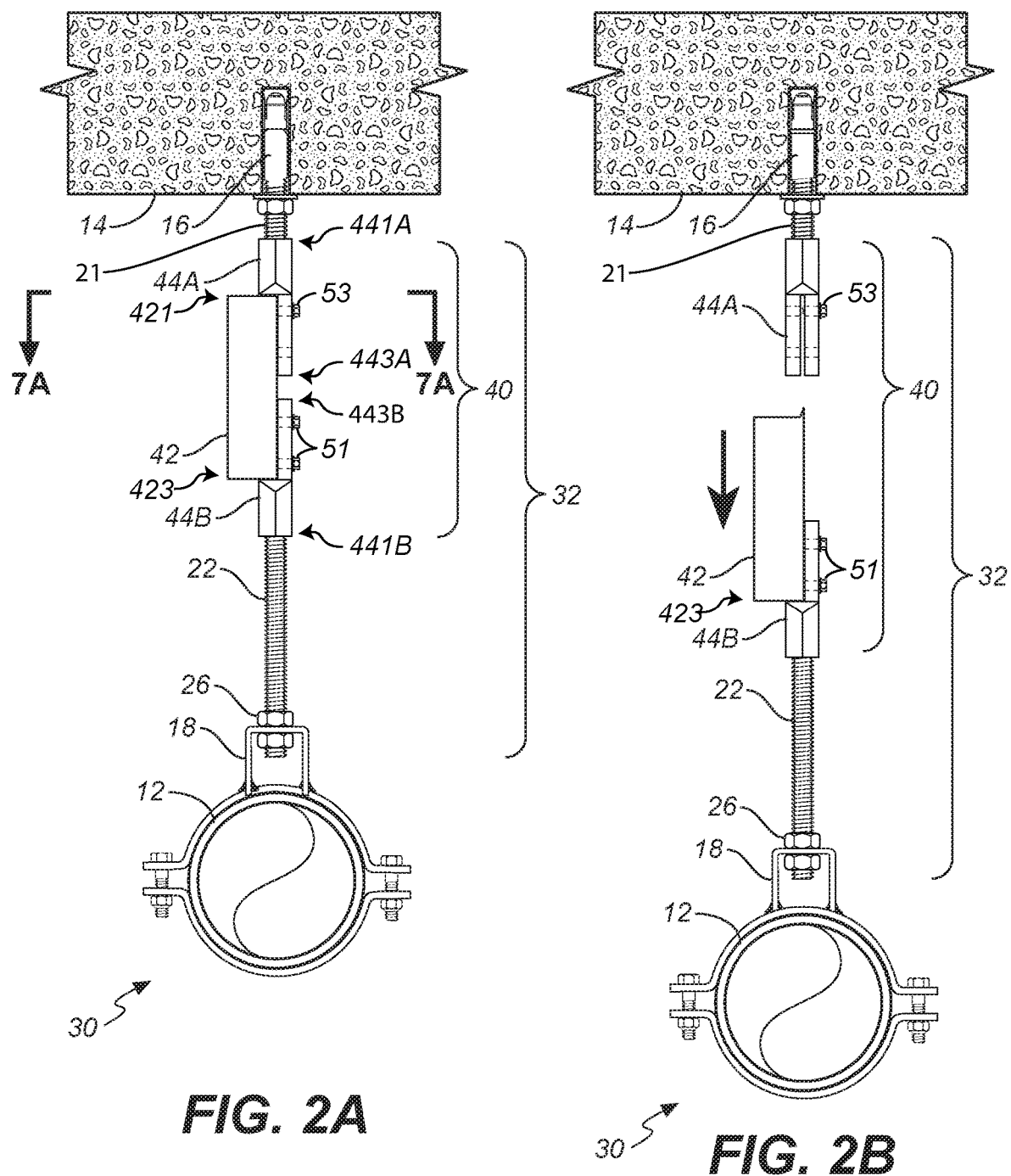
FIG. 2A is an elevational view of a first embodiment connector assembly installed to support a conduit from a concrete deck.
FIG. 2B is the view of FIG. 2A, where the conduit hanger assembly is subjected to a sufficient force to cause the hanger assembly to fail.

FIG. 2A is an elevational view of a first embodiment conduit hanger assembly 30 installed to support conduit 12 from concrete deck 14. Conduit hanger assembly 30 includes anchor 16 which may be placed within concrete deck 14. Anchor 16 can, in general, be a drill-in, shoot-in or glue-in type anchor for attaching to poured concrete or a cast-in-place type anchorage that is set into the concrete during pouring.

Anchor 16 is attached to a first threaded rod 21 that extends downwards from the anchor, and a connector assembly 32 attached to the first threaded rod and which supports bracket 18. More specifically, connector assembly 32 includes a connector link assembly 40 into which first threaded rod 21 and threaded rod 22 are theadable and threaded nuts 26 which are used to support bracket 18.

Connector link assembly 40 and the various embodiments and combinations described here function as a tension component for supporting conduits up to some maximum load. When the maximum load is exceeded, the connector link assembly 40, which is frangible breaks. In certain embodiments, the connector link assembly 40 breaks by a ductile fracture. This invention facilitates the design of utility hanger assemblies and the like so that in the serial chain of components supporting a load, the link assembly will meet the load requirements and be the first to fail in an overload condition.

Connector link assembly 40, as discussed subsequently in greater detail, includes a connector piece 42 having a first end 421 and a second end 423, and a pair of connector links shown as an upper link 44A having a first end 441A and a second end 443A, and a lower link 44B having a first end 441B and a second end 443B. First end 441A has internal threads and is threadably connected to threaded rod 21 and second end 443A is attached to first end 421 using fastener (s) 53. First end 441B has internal threads and is threadably connected to threaded rod 22 and second end 443B is attached to second end 423 using fastener(s) 51, as discussed subsequently.

Conduit hanger assembly 30 is designed to be able to hold the load of conduit 12 from concrete deck 14 and, in the case of a sufficiently large tensile force, fail before the concrete fails. In this way, conduit hanger assembly 30 does not damage the integrity of concrete deck 14.

In certain embodiments, connector link assembly 40 undergoes testing to determine the maximum load that it may support in a seismic event. The actual tests may vary according to local building codes. In general, one may determine a maximum permissible load for any configuration of connector link assembly 40 by, for example, seismic testing.

Thus, in one embodiment, connector piece 42 is frangible and, specifically, is designed to be the weakest part of conduit hanger assembly 30 under tension. FIG. 2B is the view of FIG. 2A, where connector piece 42 is subjected to a sufficient force to fail before the concrete deck fails. The inventive conduit hanger assembly 30 thus fails with a break in connector piece 42, leaving anchor 16, threaded rod 21, and upper link 44A attached to concrete deck 14. This is in contrast to the prior art conduit hanger assembly, as shown in Prior Art FIG. 1B.

The failure of connector piece 42 near upper connector link 44A is illustrative, and the failure mode of conduit hanger assembly 30 may be at some other place in the conduit hanger assembly, such as in connector piece 42 near lower connect link 44B, some other location in the connector piece, or some other location within the conduit hanger assembly that does not result in damage to concrete deck 14.

In certain embodiments, connector links 44A and 44B are identical, and are shown in FIGS. 3A through 3E as one embodiment of a connector link 44, where FIG. 3A is a perspective view, FIG. 3B is a front elevational view, FIG. 3C is a side elevational view of the connector link of FIG. 3A, FIG. 3D is a top plan view, and FIG. 3E is a bottom plan view. Connector link 44 has a first end 4401, which is generally similar to first ends 441A and 441B of FIG. 2A and a second end 4403, which is generally similar to second ends 443A and 443B of FIG. 2A. First end 4401 has a bore 49 that is threaded to accept a male threaded rod, stud or bolt, such as a threaded rod 21 or 22, and two legs 45 defining a narrow gap 46 (as, for example, second ends 443A and 443B of FIG. 2A) between the two legs, and transverse holes 47 through legs 45 that align on either side of the gap 46. While FIGS. 3A, 3B, and 3C show two holes 47, various embodiments may have one hole or may have three or more holes.

First end 4401 also includes an upper portion 48 which is hexagonally shaped along a longitudinal axis to facilitate cooperation with wrenches and tools for engagement and tightening a threaded connection. Alternatively, upper portion 48 may be cylindrical, square or other shape depending on the type of connection method. The gap 46 is designed to accept a connector piece, such as connector piece 42. In certain embodiments, an end of gap 46 provides a seat against which connector piece 42 rests when the connector piece is fully inserted into gap 46. A pin placed through transverse hole 47 can also pass through a hole in the connector piece 42, as discussed subsequently, for retaining connector piece 42. Fastener(s) 51 and 53 and transverse hole 47 may, in alternative embodiments, be unthreaded, partially threaded, or threaded throughout.

In a second embodiment conduit hanger assembly, connector link 44A and first threaded rod 21 of conduit hanger assembly 30 are replaced with a second embodiment connector link 54, which combines the function of connector link 44A and the first threaded rod 21. FIG. 4A is a front elevational view of second embodiment connector link 54, and FIG. 4B is a side elevational view of the connector link of FIG. 4B. Connector link 54 is generally similar to connector link 44 and first threaded rod 21, except as explicitly stated.

Figure 6A:
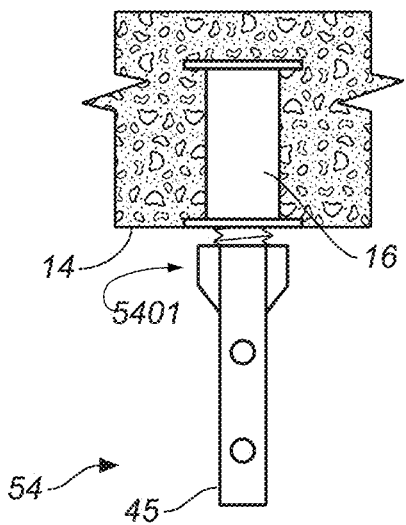
FIG. 6A is a side elevational view of the connector link of FIGS. 4A and 4B attached to a concrete anchor.

Connector link 54 has a first end 5401 and a second end 5403. First end 5401 includes an integral or attached threaded stud 56 that is threadable into anchor 16. Second end 5403 is generally similar to second end 4403 and supports connector piece 42. FIG. 6A is a side elevational view of the connector link of FIGS. 4A and 4B attached to a drill-in type anchor 16.

In a third embodiment conduit hanger assembly, connector link 44A, first threaded rod 21, and anchor 16 of conduit hanger assembly 30 are replaced with a third embodiment connector link 64, which combines the function of connector link 44A, the first connector rod, and the anchor. FIG. 5A is a front elevational view of a third embodiment connector link 64, and FIG. 5B is a side elevational view of the connector link. Connector link 64 is generally similar to connector link 54 and/or 44, except as explicitly stated.

Figure 6B:
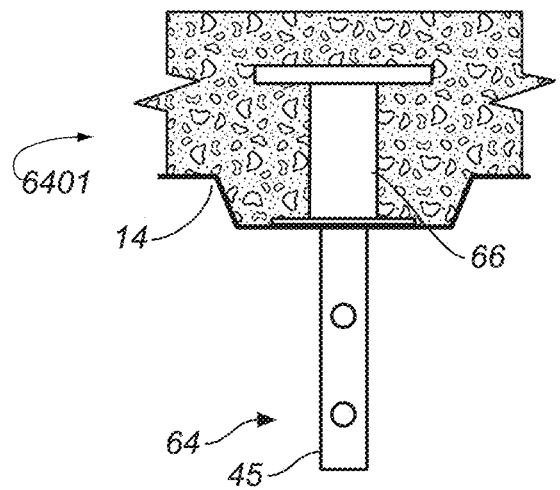
FIG. 6B is a side elevational view of the connector link of FIGS. 5A and 5B cast into a concrete structure.

Connector link 64 includes an anchor 66, at a first connector link end 6401, and two legs 45 defining a narrow gap 46 at a second connector link end 6403. Anchor 66 of first connector link end 6401 can be anchored directly in the concrete pour of concrete deck 14, and second connector link end 6403 can support connector piece 42. FIG. 6B is a side elevational view of the connector link of FIGS. 5A and 5B cast into a concrete deck 14.

Figure 7A:
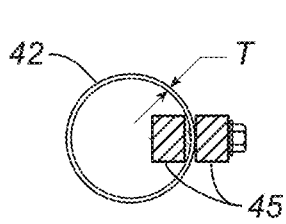
FIG. 7A is a sectional view 7A-7A of FIG. 2A, where connector piece 42, is a length of electrical conduit disposed in the gap 46 of the legs 45.
Figure 7B:
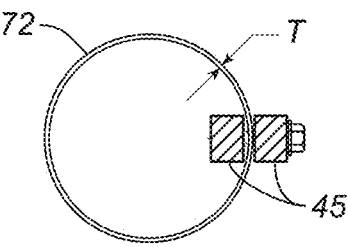
FIG. 7B is similar to FIG. 7A, where connector piece 42 is a length of pipe 72.
Figure 7C:
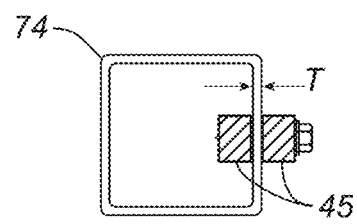
FIG. 7C is similar to FIG. 7A, where connector piece 42 is a length of rectangular tubing 74.
Figure 7D:
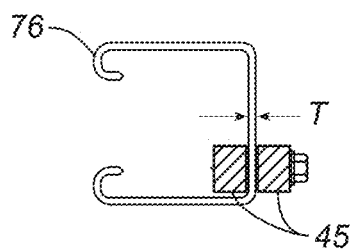
FIG. 7D is similar to FIG. 7A, where connector piece 42 is a length of strut channel 76.
Figure 7E:
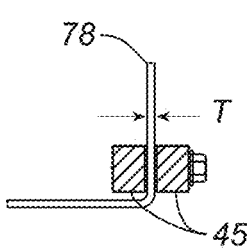
FIG. 7E is similar to FIG. 7A, where connector piece 42 is a length of an angle piece 78.

A wide variety of geometries may be used for connector piece 42. Thus, for example and without limitation, FIG. 7A is a sectional view 7A-7A of FIG. 2A, where connector piece 42, is a length of electrical conduit disposed in the gap 46 of the legs 45 Legs 45 may which may be, for example and without limitation, the legs of connector link 44, 54, or 64. As further examples of connector piece 42: FIG. 7B is similar to FIG. 7A, where connector piece 42 is a length of pipe 72; FIG. 7C is similar to FIG. 7A, where connector piece 42 is a length of rectangular tubing 74; FIG. 7D is similar to FIG. 7A, where connector piece 42 is a length of strut channel 76; and FIG. 7E is similar to FIG. 7A, where connector piece 42 is a length of an angle piece 78.

Figures 8A, 8B, 8C, 8D:
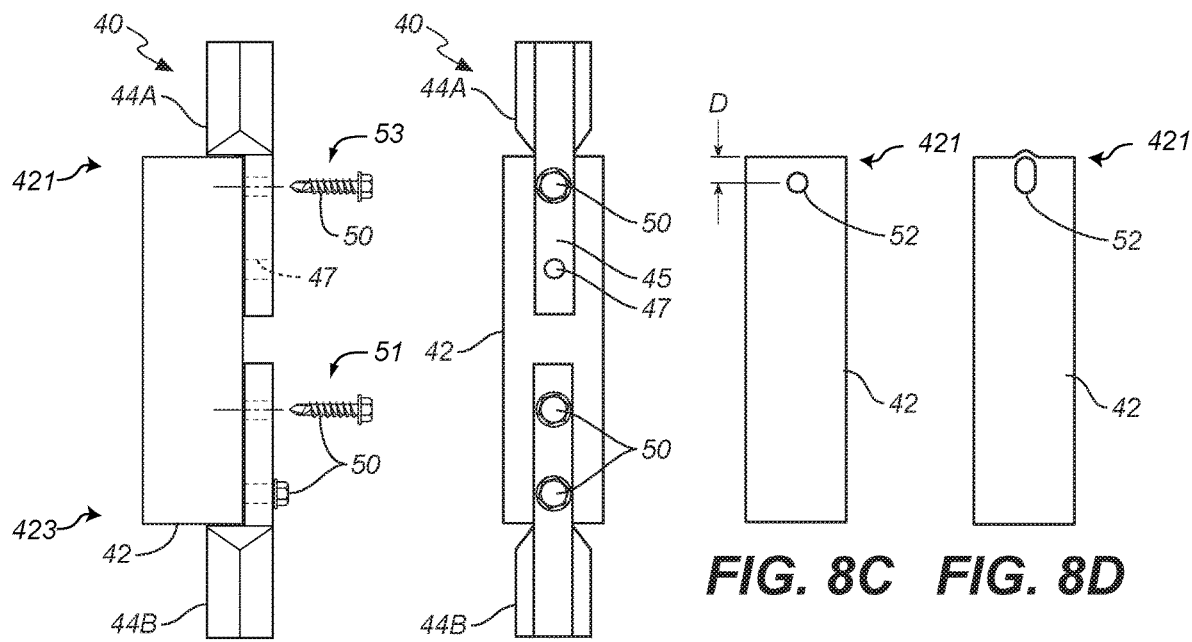
FIG. 8A is a front elevational view of the preferred embodiment of the inventive connector link assembly, wherein the calibrated connection is at the proximal end of the connector assembly.
FIG. 8B is a side elevational view of the preferred embodiment of the inventive connector link assembly.
FIG. 8C is a side elevational view of the preferred embodiment of the connector element of the inventive connector link assembly shown in FIG. 8B.
FIG. 8D is a side elevational view of the preferred embodiment of the connector element of the inventive connector link assembly shown in FIG. 8B after tension force of the assembly starts to distort the connection element.

FIGS. 8A, 8B, and 8C are illustrative of one method of assembling the pieces of connector assembly 40 using connector piece 42. FIG. 8C is a side view of connector piece 42, and FIGS. 8A and 8C are a front elevation view and side elevational view, respectively, of connector assembly 40. It will be appreciated that the following description applies, for example and without limitation, to any of the other connector pieces, such as connector piece 42, 74, 76, or 78.

As shown in FIG. 8C, connector piece 42 has, or is provided with, one or more holes 52 and, as shown in FIGS. 8A and 8B, connector piece 42 is attached to links 44A and 44B by placing each end of connector piece 42 is positioned all of the way into gap 46 of each connector link 44. Next, fastener(s) 51 and 53, which may be, for example, one or more fasteners 50 which are self-drilling, self-tapping, standard threaded, pins or rivets. In any case, hole or holes 52 in connector piece 42 are provide to will align with holes 47 in the connector links 44A/44B. In certain embodiments, hole 52 is positioned at a predetermined distance D from first end 421 by pre-drilling the hole. In the embodiments, where hole 52 is not pre-drilled, connection piece 42 may be inserted into gap 46 such that a desired distance D is achieved by advancing the fastener into the connection piece.

In certain embodiments, the distance D determines when connection piece 42 fails, as shown in FIG. 2B. Since larger distances D correspond to a higher load before failure, a user may select a distance D that determines when conduit hanger assembly 30 will fail under a tensile load.

Figures 9A, 9B:
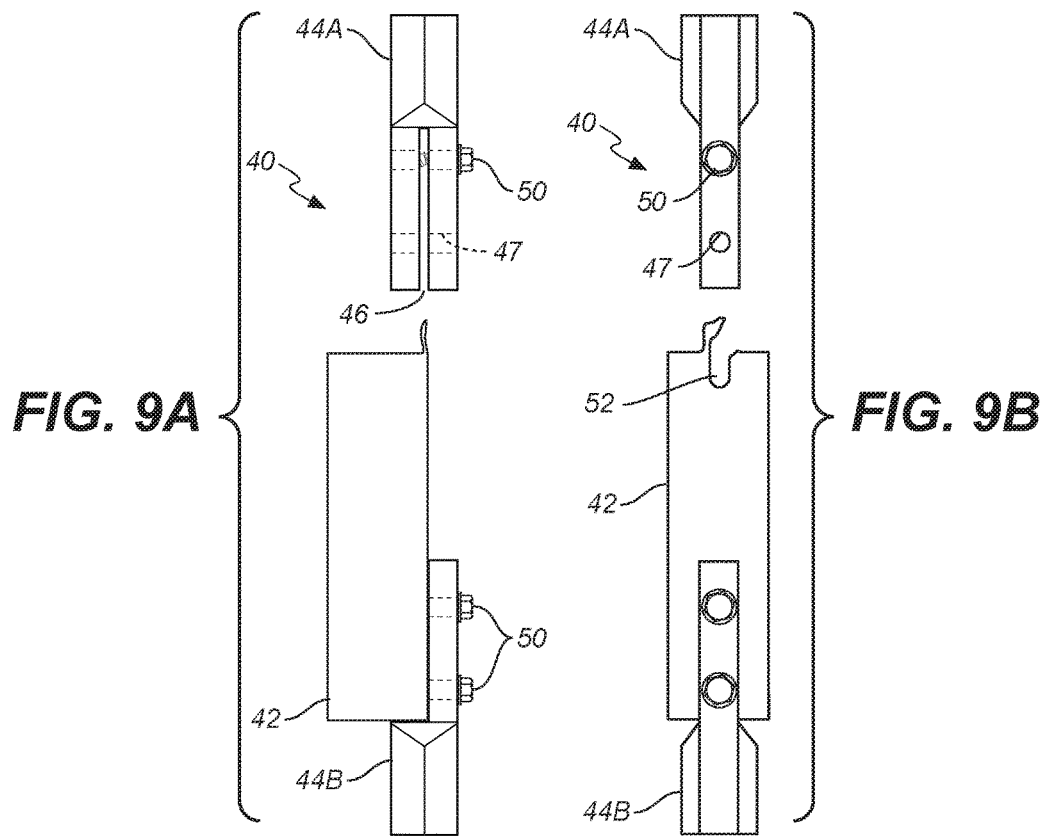
FIG. 9A is a front elevational view of the preferred embodiment of the inventive connector link assembly after the tension force quotient has been exceeded.
FIG. 9B is a side elevational view of the preferred embodiment of the inventive connector link assembly after the tension force quotient has been exceeded.

One example of the desired structural failure of frangible connector piece 42, which is not meant to limit the scope of the present invention, is illustrated in FIGS. 8C, 9A, and 9B, where FIG. 8C is a side view of connector piece 42 prior to failure, and FIGS. 9A and 9B are a front elevation view and side elevational view, respectively, of connector assembly 40 after the structural failure of connector piece 42. Regardless of how hole 52 is formed, under a sufficient tensile load, the hole may first elongate as it undergoes ductile fracture, as shown in FIG. 8D. As the load increases, connector assembly 40 will ultimately fail when the strength of the connector assembly is exceeded, as shown in FIGS. 9A and 9B.

In certain embodiments, the maximum load which connector assembly 40 may support is determined by several parameters, which may be, for example, the thickness T of connector piece 40 (see FIGS. 7A-7E), the material of the connector piece, the distance D between hole 52 and first end 421, and details of fastener 50, such as the fastener size and material.

Thus, as described above, failure loads for specific connector assembly 40 may be determined as a function of the various parameters noted in the previous paragraph (fastener type, thickness, materials, hole locations and diameters, etc.). The selection of parameters thus provides a calibration indicating the failure of the connector assembly and a user can be provided with configurations which may fail at certain loadings.

Figure 10A:
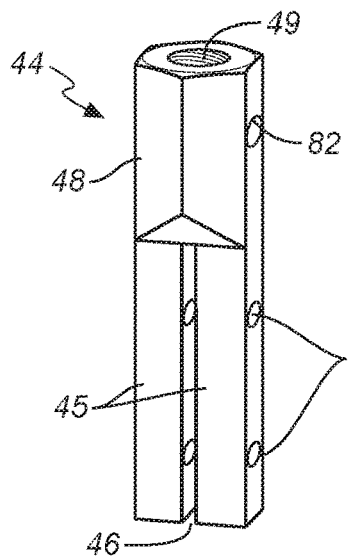
FIG. 10A is a perspective view of an first alternative embodiment of a connector link.
Figure 10B:
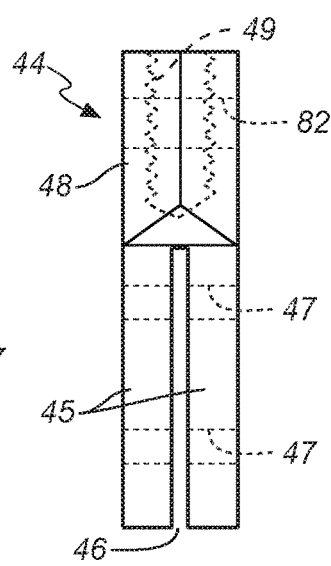
FIG. 10B is a front elevational view of the connector link of FIG. 10A.
Figure 10C:
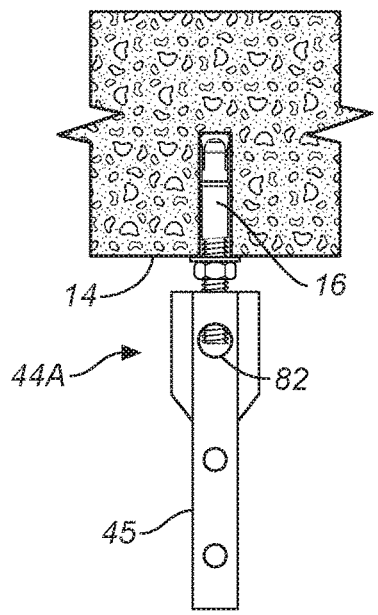
FIG. 10C is a side elevational view of the connector link of FIG. 10A attached to a concrete anchor.

FIGS. 10A-10C illustrate a first alternative embodiment of connector link 44 of FIG. 3A including aperture 82 at upper portion 48, where FIG. 10A is a perspective view, FIG. 10B is a front elevational view, and FIG. 10C is a side elevational view of the connector link as upper connector link 44A attached to a concrete anchor 16. First alternative connector link 44 may, in general, be used as upper link 44A or lower link 44B.

Aperture 82 intersects the bore 49, and may alternatively continue through the opposite side of upper portion 48. Aperture 82 permits visual inspection of the engagement of anchor 16 threads, as shown in FIG. 10C.

Figure 11A:
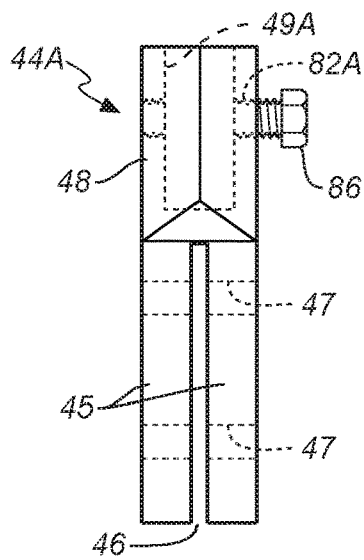
FIG. 11A is front elevational view a second alternative embodiment of connector link.
Figure 11C:
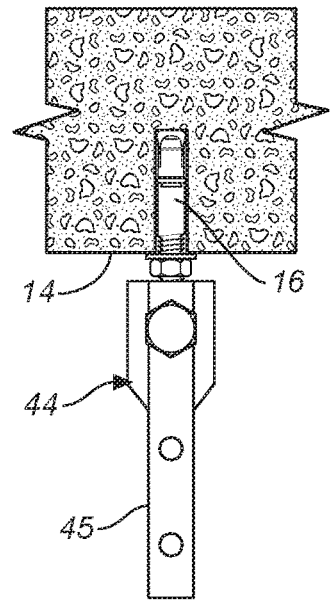
FIG. 11C is a side elevational view of an upper connector link of FIG. 11A attached to concrete anchor.
Figure 11B:
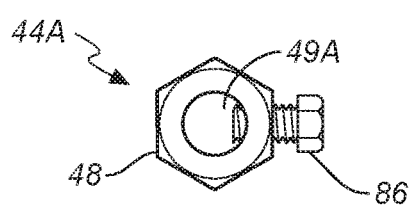
FIG. 11B is a top plan view of the connector link of FIG. 11A.

FIGS. 11A-11C illustrate a second alternative embodiment of connector link 44 of FIG. 3A including a threaded aperture 82A, where FIG. 11A is front elevational view, FIG. 11B is a top plan view, and FIG. 11C is a side elevational view of the connector link as upper connector link 44A attached to concrete anchor 16. Second alternative connector link 44 may, in general, be used as upper link 44A or lower link 44B.

Connector link 44 of FIGS. 11A-11C is useful for further securing the connector link to anchor 16. Threaded aperture 82A can accept a threaded fastener 86 that can act as a set-bolt when tightened against a rod inserted into a bore 49A, which may be threaded or non-threaded.

As in the second alternative embodiment link 44, aperture 82A may pass through upper portion 48 to bore 49A, or may pass through the opposite wall. The set-screw arrangement will work well securing non-threaded rods.

FIGS. 12A-12C illustrate the second alternative embodiment connector link 44 of FIG. 11A with a clevis-type attachment, where FIG. 12A is a front elevational view, FIG. 12B is a side elevational view, and FIG. 12C is a front elevational view of the connector link attached to concrete anchor 16.

FIGS. 12A-12C show the second alternative embodiment connector link 44A of FIG. 11A and a clevis 94, formed by the combination of a U-shaped bracket 90, a bolt 88 and a nut 89 pivotally attached to the connector link at aperture 82. The top of bracket 90 includes an aperture 92 to allow connection to anchor 16 or other components in a hanger assembly.

FIGS. 13A, 13B, and 13C are front elevational views of a first, second, and third alternative embodiment of connector assembly 40. From either calculations or from trial-and-error, the amount of tensile load required for connector piece 42 to fail at that location can be determined, and can be considered to be a calibrated strength of conduit hanger assembly 30.

In the embodiment of FIG. 13A, there are two fasteners 53 near first end 421 and one fastener 51 located a distance D1 from second end 423. With this embodiment, the weakest part of connector piece 42 is between second end 423 and the hole that is at the distance D1 from the second end.

In the embodiment of FIG. 13B, there is one fasteners 53 located a distance D2 from first end 421 and two fasteners 51 located near second end 423. With this embodiment, the weakest part of connector piece 42 is between first end 421 and the hole that is at the distance D2 from the first end.

In the embodiment of FIG. 13C, there is one fasteners 53 located a distance D2 from near first end 421 and one fastener 51 located a distance D3 from second end 423. For this embodiment, the distances D2 and D3 determine the load factor at each end of the connector piece.

Figure 14A:
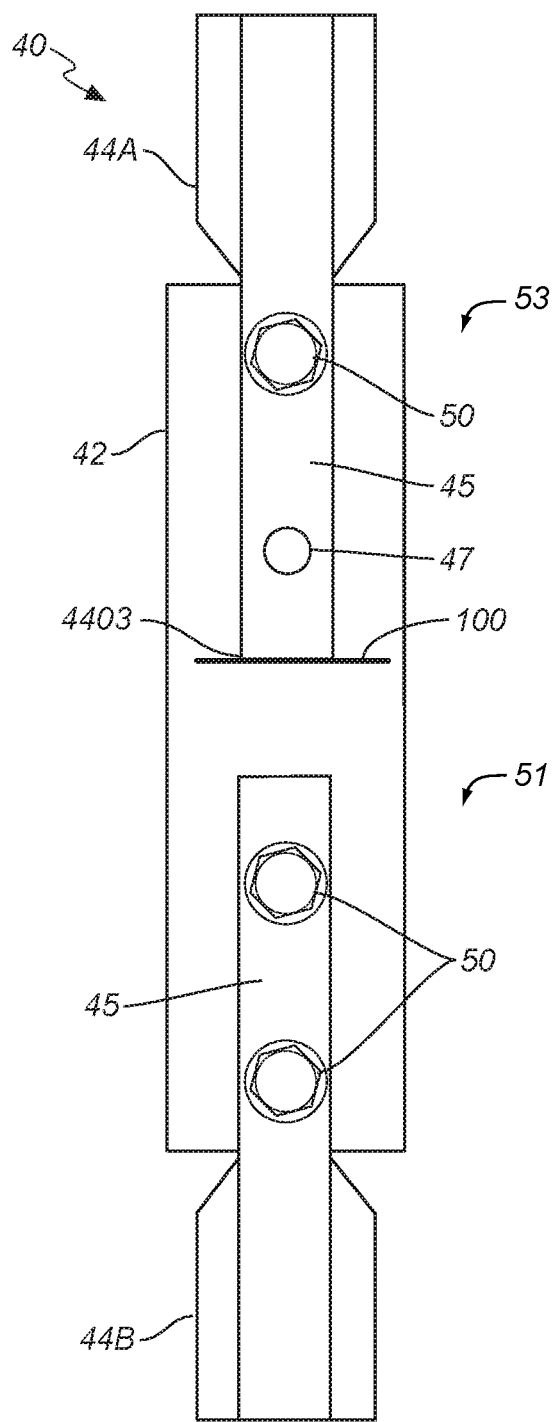
FIG. 14A is a side elevational view of the connector link assembly with indicia that establishes the initial location of the inventive connector link relative to an attached connector piece.

FIG. 14A is a side elevational view of any of the connector link assemblies described herein with indicia 100. Thus, for example, connector link assembly 40 of FIG. 13B is shown with indicia 100 on connector piece 42. A user may user indicia 100 to align connector piece 42 with end 4403 of upper link 44A, prior to inserting one fastener 53. This allows the user to be sure that the proper spacing is provided for fastener 53.

Figure 14B:
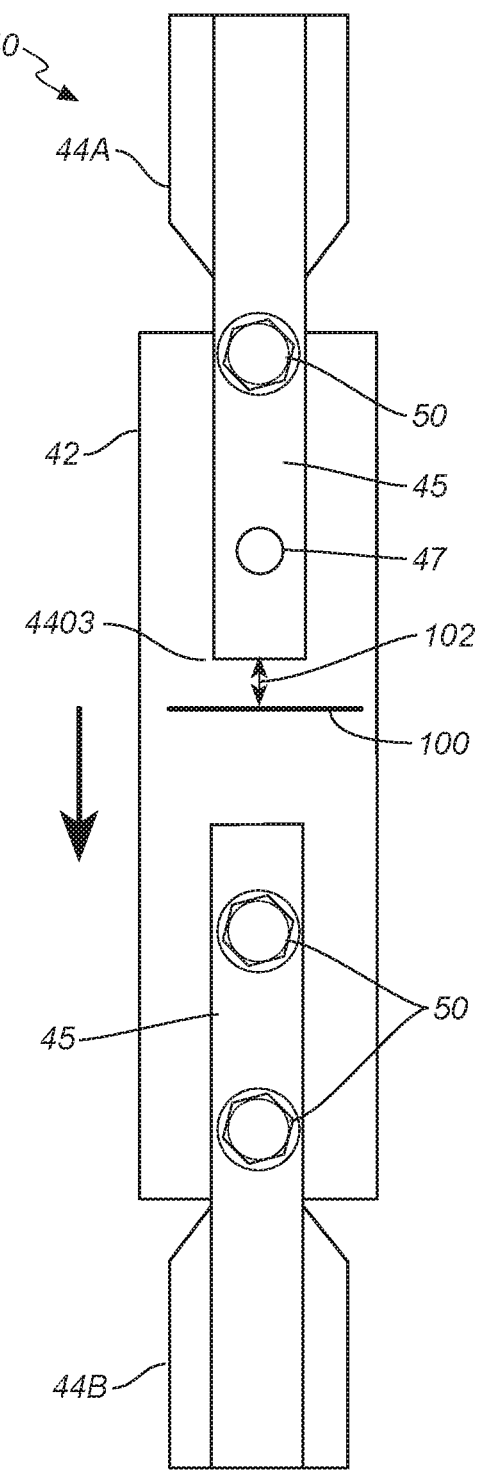
FIG. 14B is a side elevational view of the connector link assembly of FIG. 14A after a seismic event.

Another advantage of indicia 100 is shown in FIG. 14B, which shows connector link assembly 40 after a seismic event that did not result in the complete failure of connector piece 42. Thus, for example, if there is partial tearing of connector piece 42, connector link assembly 40 may stretch without breaking. Thus, upper link 44A and lower link 44B may, as a result of the stretching or tearing of connector piece 42, move apart by a distance 102, as a user would clearly see by inspection of the connector piece as shown in FIG. 14B.

Figure 15A:
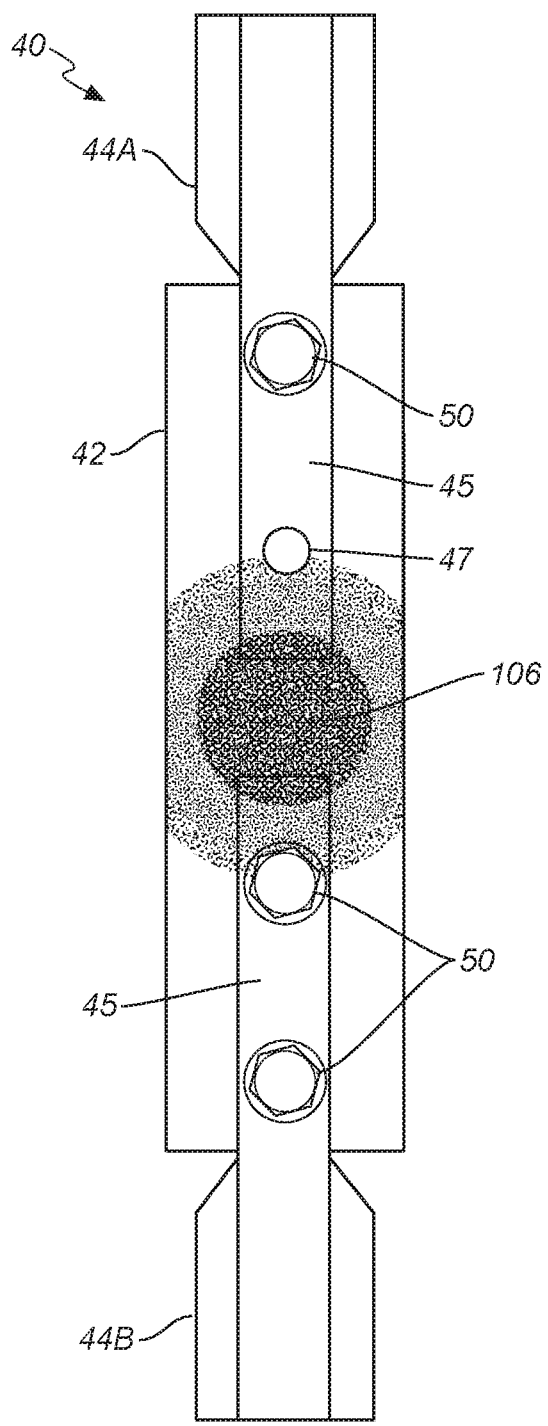
FIG. 15A is a side elevational view of the connector link assembly with alternative indicia that establishes the initial location of the inventive connector link relative to an attached connector piece.
Figure 15B:
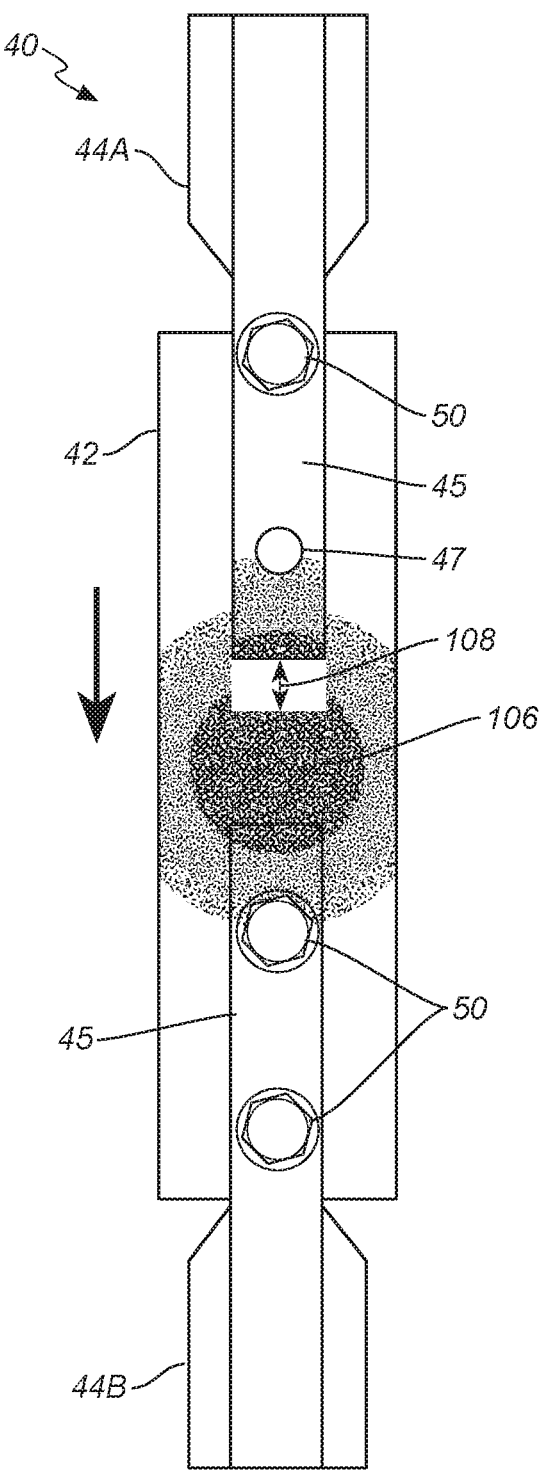
FIG. 15B is a side elevational view of the connector link assembly of FIG. 15A after a seismic event.

An alternative indicia 106 is shown in FIG. 15A, which is a side elevational view of the connector link assembly 40 with alternative indicia as a sprayed-on contrast such as paint or dye. Indicia 106 has the similar benefits as indicia 100, in that it can be used to align connector link assembly 40, as in FIG. 15A. Further, as shown in FIG. 15B, which is a side elevational view of the connector link assembly of FIG. 15A after a seismic event (as in FIG. 14B), a gap 108 in indicia 106 is easily seen to indicate structural damage to connector piece 42.

The conduit hanger assembly component described herein are easily arranged and adapted to support conduits in a building. Typically, the location and run of utilities in a building are only generally specified by the building designers, and installers came decide how to make each hanger for each location. Thus, for example, the connector links described herein could be provided to a job site in bulk, and connector link assemblies could be entirely made on-site with commonly available material for connector pieces. As a result, frangible conduit hanger assemblies could be easily constructed in most circumstances for a variety of applications and situations. FIGS. 16, 17, 18, 19, and 20 illustrate a few of the many examples of applications of the inventive frangible members.

Figure 18:
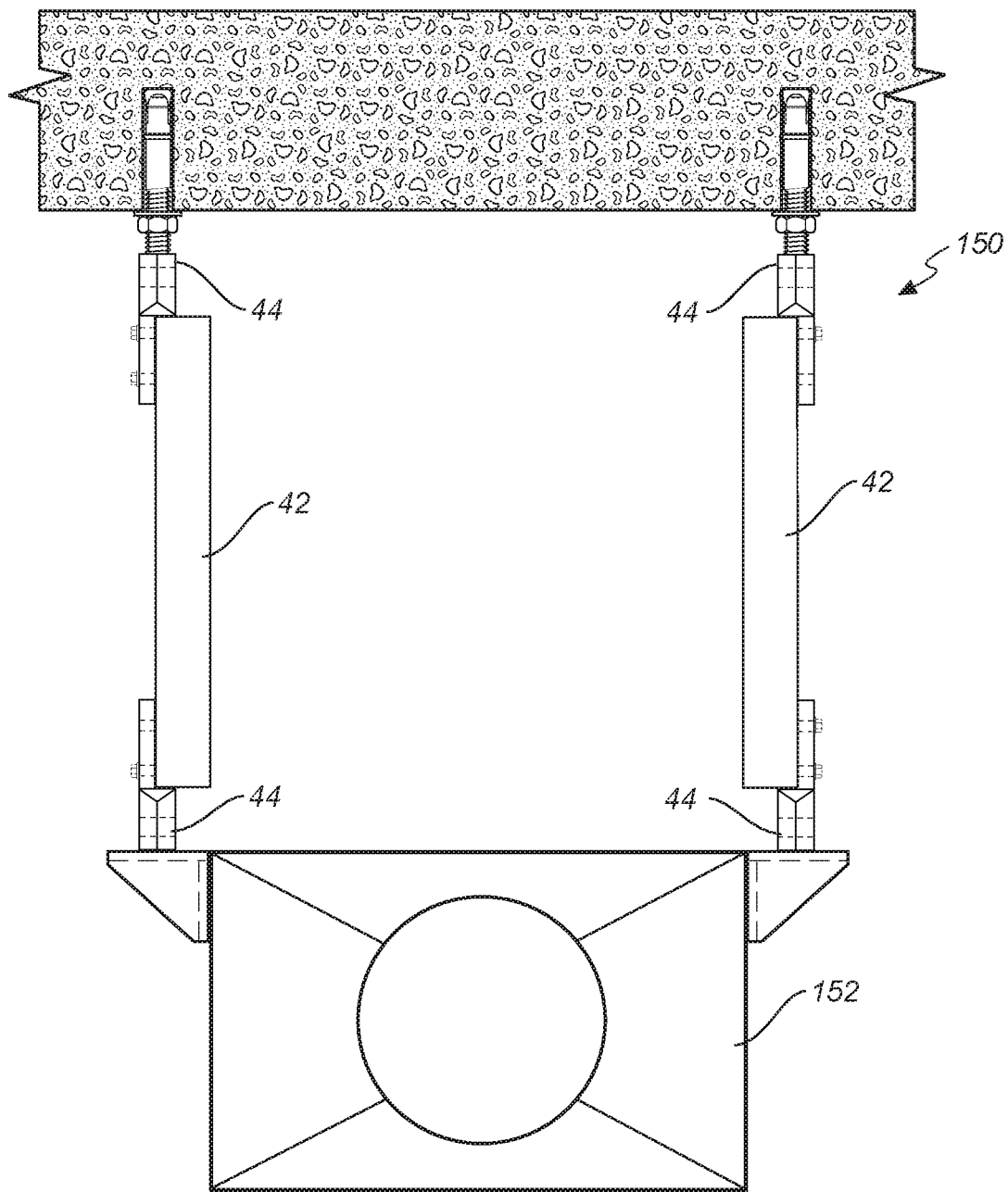
FIG. 18 is an elevational view of an installed version of yet another conduit hanger for suspending a conduit.
Figure 19:
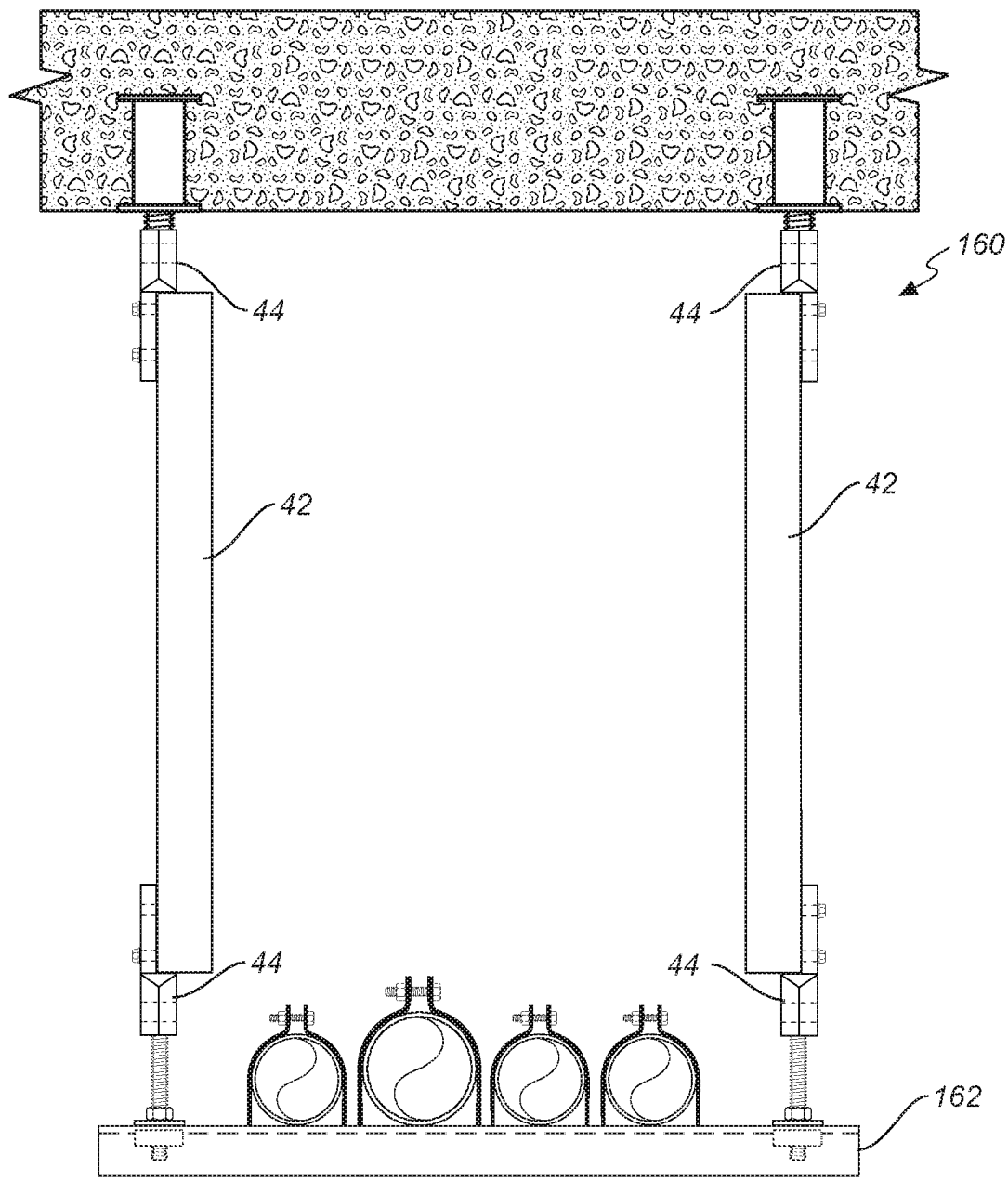
FIG. 19 is an elevational view of an installed version of another conduit hanger for suspending several conduits.

FIG. 16 is an elevational view of an installed alternative conduit hanger assembly 120 with two connector link assemblies 40 in series. FIG. 17 is an elevational view of an installed other alternative conduit hanger assembly 140 with one link 44. Conduit hanger assembly 130 includes a connector piece 42 that is attached directly to bracket 18 without an intervening lower bracket. FIG. 18 is an elevational view of an installed version of yet another conduit hanger 150 with inventive links 40 as used for supporting ducting 152. FIG. 19 is an elevational view of an installed version of another conduit hanger 160 as used for supporting a trapeze 152 including several conduits.

EXAMPLES

The following examples are results of tests on several embodiments described herein. Specifically, conduit hanger assembly 30, as in FIGS. 2A and 2B was tested with a ½ inch anchor 16 and for various dimensions of connector piece 42.

It was previously determined that, for a bolt 16 comprising a ½ inch diameter, a TRUBOLT+ Carbon Steel Seismic Wedge Type Anchor (ITW Commercial Construction, Glendale Heights, Ill.) will fail under tension with a load of 8,925 lbs. When the bolt has an embedment of 3½ inches into a minimum concrete thickness of 6 inches, the concrete surrounding an embedded bolt will fail at a Cracked Concrete Strength of 5,455 lbs. Including a factor of safety, which are required by building codes, the maximum load on such an anchor must be less than 2,659 lbs.

Tests were performed on by placing threaded rods 21 and threaded rod 22 of conduit hanger assembly 30 in tension of increasing amounts until the assembly failed. If the conduit hanger assembly 30 fails under a load less than 2,659 lbs., then the conduit hanger assembly can safely be used to support loads without causing failure of the concrete.

A number of conduit hanger assemblies 30, similar to that of FIGS. 2A and 2B were assembled. In each conduit hanger assembly, connector piece 42 was formed from electrical metallic tubing (EMT) conduit, which is a commonly available thin-walled steel tube having a circular cross section. Specifically, tests were conducted with EMT conduit sizes of ¾", 1", 1¼", 1½" and 2", with one fastener 53, which was a ¼ inch screw that was screwed through the conduit wall at a location, D, ⅜" from center of screw hole to cut end of conduit (see FIG. 8C). The test results are presented in Table 1.

TABLE 1

| EMT Trade Size Designator | Nominal Wall Thickness (inches) | Ductile Failure Load (lbs.) |
|---|---|---|
| ¾" | 0.049 | 1501 |
| 1" | 0.057 | 1843 |
| 1¼" | 0.065 | 2056 |
| 1½" | 0.065 | 2056 |
| 2" | 0.065 | 2056 |

Table 1 shows that each of the assemblies failed with loads less than 2,659 lbs., thus ensuring that the conduit hanger assembly will fail before the concrete near the anchor fails. Table 1 also shows that failure load increases with wall thickness, as the 1¼", 1½" and 2" connector pieces all have the same wall thickness and the same load for ductile failure of the connector piece.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment. Furthermore, the particular features, structures or characteristics may be combined in any suitable manner, as would be apparent to one of ordinary skill in the art from this disclosure, in one or more embodiments.

Similarly, it should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Further, those skilled in the art will recognize that other and further modifications may be made thereto without departing from the spirit of the invention, and it is intended to claim all such changes and modifications as fall within the scope of the invention.

The invention claimed is:

1. A method of preventing damage to a concrete deck resulting from a seismic event, said method comprising:
   supporting a conduit a first distance below the concrete deck with a hanger assembly, where the hanger assembly includes
      a first hanger assembly portion attachable to the concrete deck and Including a first gap having a first open end and a first closed end at opposing longitudinal ends of the first gap respectively, the first closed end defining a first seat,
      a second hanger assembly portion for accepting the conduit and including a second gap having a second open end and a second closed end at opposing longitudinal ends of the second gap respectively, the second closed end defining a second seat, and
      an element having a longitudinal side and a first element end and a second element end substantially perpendicular to the longitudinal side, where said first element end is positioned in the first gap through the first open end and attached to said first hanger assembly portion, where said second element end is positioned in the second gap through the second open end and attached to said second hanger assembly portion, and where said first element end contacts said first seat or said second element end contacts the second seat, wherein a central longitudinal axis of the element is offset from a central longitudinal axis of the first or second gap, and where the element is a frangible element; and
   determining, after the deck, the hanger assembly, and the conduit are subjected to the seismic event and while the conduit is supported by the hanger assembly from the concrete deck, if the distance between the conduit and the concrete deck is greater than the first distance, thereby indicating that the element of the hanger assembly is damaged.

2. The method of claim 1, where the element has an aperture, where the hanger assembly includes a fastener, and where said supporting the conduit includes placing the fastener through the aperture.

3. The method of claim 2, where the element is damaged by a ductile failure including tearing or stretching the element at the aperture.

4. The method of claim 1, where said determining includes examining markings on the hanger assembly.

5. The method of claim 1, where, after the deck, the hanger assembly, and the conduit are subjected to the seismic event and while the conduit is supported by the hanger assembly from the concrete deck, the concrete deck near the hanger assembly is not damaged.

6. The method of claim 1, where the element undergoes structural failure during the seismic event and before the hanger assembly damages the concrete deck.

7. A hanger assembly configured to support a conduit from an underside of a concrete deck, said hanger assembly comprising:
   a first hanger assembly portion attachable to the concrete deck and including a first gap having a first open end and a first closed end at opposing longitudinal ends of the first gap respectively, the first closed end defining a first seat,
   a second hanger assembly portion for accepting the conduit and including a second gap having a second open end and a second closed end at opposing longitudinal ends of the second gap respectively, the second closed end defining a second seat, and
   an element having a longitudinal side and a first element end and a second element end substantially perpendicular to the longitudinal side, where said first element end is positioned in the first gap through the first open end and attached to said first hanger assembly portion, where said second element end is positioned in the second gap through the second open end and attached to said second hanger assembly portion, and where said first element end contacts said first seat or said second element end contacts the second seat, wherein e central longitudinal axis of the element is offset from a central longitudinal axis of the first or second gap, and where the element is a frangible element,
   wherein said hanger assembly has
      a first configuration, where said hanger assembly is configured to support an accepted conduit a first distance from the concrete deck, and
      a second configuration resulting from said first configuration being subjected to a seismic event which results in a ductile failure of the element, where said second configuration is configured to support the accepted conduit a second distance from the concrete deck, and where said second distance is greater than said first distance.

8. The hanger assembly of claim 7, where said hanger assembly includes a first fastener and a second fastener,
   where said element includes a first aperture sized to accept said first fastener and a second aperture sized to accept said second fastener,
   where said first element end is attached to said first hanger assembly portion by said first fastener placed through said first aperture, and
   where said second element end is attached to said second hanger assembly portion by said second fastener placed through said second aperture.

9. The hanger assembly of claim 7, where said element is a tube.

10. The hanger assembly of claim 7, where said element is a channel.

11. The hanger assembly of claim 7, where said element is an angle iron.

12. The hanger assembly of claim 7, where the element is configured to undergo structural failure during the seismic event and before the hanger assembly damages the concrete deck.

* * * * *